(No Model.)
V. C. BAKER.
TEA KETTLE.
No. 482,972. Patented Sept. 20, 1892.
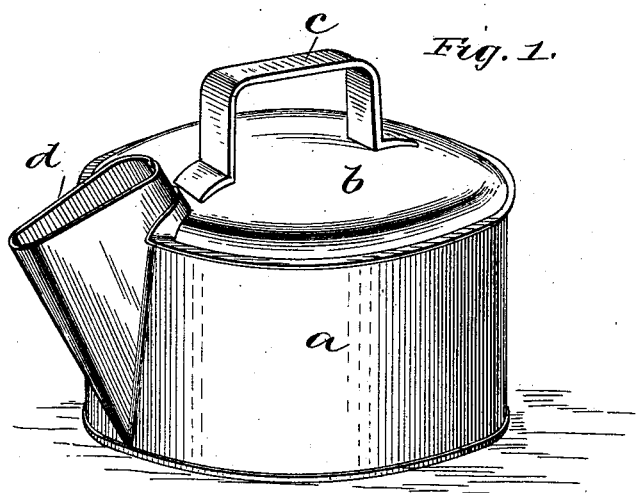
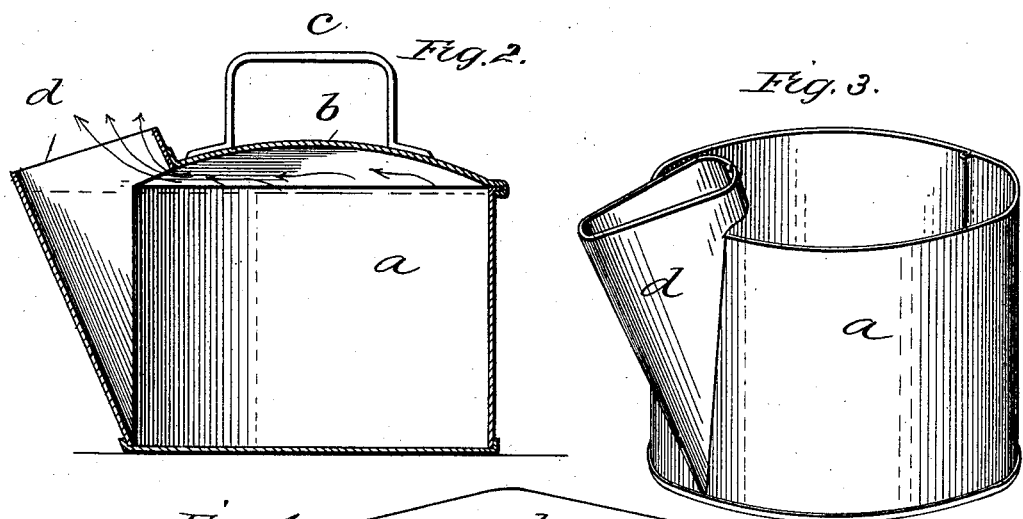
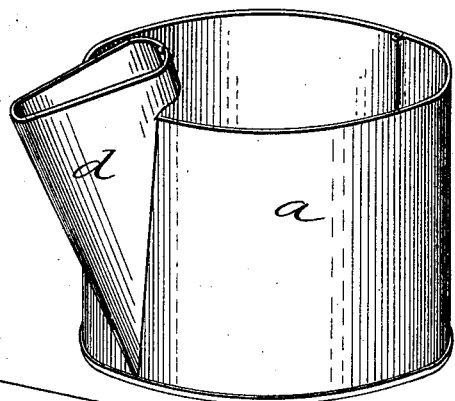
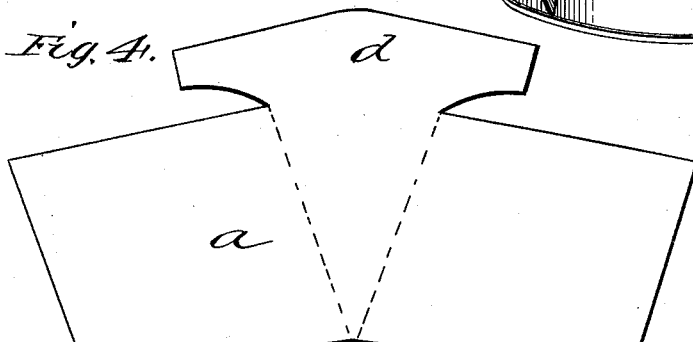

UNITED STATES PATENT OFFICE.

VOLNEY C. BAKER, OF MOUNT MORRIS, NEW YORK.

TEA-KETTLE.

SPECIFICATION forming part of Letters Patent No. 482,972, dated September 20, 1892.

Application filed March 3, 1892. Serial No. 423,678. (No model.)

*To all whom it may concern:*

Be it known that I, VOLNEY C. BAKER, a citizen of the United States, residing at Mount Morris, in the county of Livingston and State of New York, have invented certain new and useful Improvements in Tea-Kettles, of which the following is a specification, reference being had therein to the accompanying drawings, in which—

Figure 1 represents a perspective view of the improved kettle; Fig. 2, a vertical section thereof; Fig. 3, a perspective view of the body of the kettle, showing the integral spout; and Fig. 4, a detail view of the blank from which the body and spout are formed.

This invention relates to certain improvements in tea-kettles; and it consists in certain novel features of construction hereinafter pointed out, and particularly specified in the claim.

Referring to the drawings, $a$ designates the body of a sheet-metal kettle, which is preferably formed circular in shape and which has secured over its top an imperforated cover or breast $b$, this breast or cover being permanently connected to the upper edge of the kettle by a steam-tight joint. A rigid handle $c$ is secured to the cover or breast, and a filling and pouring spout $d$ is formed on one side of the vessel. The cover being solid and immovable, the spout is the only point of ingress and egress for the liquid, and it is therefore used for the combined purpose of pouring the liquids and as a means of filling the kettle. This spout is upwardly and outwardly inclined and is sufficiently elongated in cross-section to have its inner end or opening extend the full length of the side of the kettle and in a short distance upon or over the top of the same, whereby the steam may at all times, irrespective of the height of the liquid in the vessel, have a free escape. This spout is preferably formed integral with the body of the vessel, so that it cannot be melted off should the kettle become dry, as shown in Fig. 3. The permanent cover or top-plate is soldered close around that part of the spout that extends in over the top of the vessel.

It will be observed that this kettle possesses important advantages over the old-style kettle, which has a separate filling-opening in its top provided with a removable cover. This filling-opening under the handle is objectionable because the steam which invariably escapes between the cover and its seat soon makes the handle too hot to touch with the hand, and it is also found in practice that the joint between the cover and the kettle is about the first place to become rusted. In the present invention these objections are obviated, there being no place for rust to readily form and the handle keeping comparatively cool during the whole time the kettle is on the fire. The combined filling and emptying spout is advantageous in that it permits the ready escape of the generated steam and also permits the interior of the kettle to be readily cleaned.

Having thus fully described my invention, what I claim, and desire to secure by Letters Patent, is—

A tea-kettle consisting of a sheet-metal body $a$, having formed integral with it a spout $d$, extending approximately the full length of the body and projecting in over the top of the kettle, a cover $b$, permanently fastened over the body and fitting closely around and secured to the portion of the spout projecting in over the kettle, and a handle secured thereto, substantially as described.

In testimony whereof I affix my signature in presence of two witnesses.

VOLNEY C. BAKER.

Witnesses:
JOHN M. HASTINGS,
CHARLES J. MILLS.